(12) United States Patent
Yang et al.

(10) Patent No.: US 11,295,105 B2
(45) Date of Patent: Apr. 5, 2022

(54) ULTRASONIC SENSING CIRCUITRY AND RELEADED DRIVING METHOD, DETECTION SUBSTRATE AND TOUCH PANEL

(71) Applicant: BOE TECHNOLOGY GROUP CO., LTD., Beijing (CN)

(72) Inventors: Shengji Yang, Beijing (CN); Xue Dong, Beijing (CN); Xiaochuan Chen, Beijing (CN); Hui Wang, Beijing (CN); Pengcheng Lu, Beijing (CN); KuanTa Huang, Beijing (CN)

(73) Assignee: BOE TECHNOLOGY GROUP CO., LTD., Beijing (CN)

( * ) Notice: Subject to any disclaimer, the term of this patent is extended or adjusted under 35 U.S.C. 154(b) by 84 days.

(21) Appl. No.: 16/765,295

(22) PCT Filed: May 28, 2019

(86) PCT No.: PCT/CN2019/088828
§ 371 (c)(1),
(2) Date: May 19, 2020

(87) PCT Pub. No.: WO2020/237504
PCT Pub. Date: Dec. 3, 2020

(65) Prior Publication Data
US 2021/0406498 A1    Dec. 30, 2021

(51) Int. Cl.
*G06K 9/00* (2006.01)
*G06F 3/041* (2006.01)

(52) U.S. Cl.
CPC ......... *G06K 9/0002* (2013.01); *G06F 3/0412* (2013.01); *G06F 3/0418* (2013.01)

(58) Field of Classification Search
CPC .... G06K 9/0002; G06F 3/0412; G06F 3/0418
See application file for complete search history.

(56) References Cited

U.S. PATENT DOCUMENTS 10,497,748 B2 * 12/2019 Panchawagh ....... G01S 7/52028
2017/0059699 A1 * 3/2017 Mathe ................. G01S 15/8906
2017/0285877 A1 * 10/2017 Hinger ................. H03K 17/74

* cited by examiner

*Primary Examiner* — Jonathan A Boyd
(74) *Attorney, Agent, or Firm* — Armstrong Teasdale LLP

(57) ABSTRACT

An ultrasonic sensing circuitry is disclosed which includes an ultrasonic sensor circuit, an input circuit, a reset circuit, a storage circuit, a selection circuit, a source follower, and a compensation circuit. The ultrasonic sensor circuit generates a sensing voltage corresponding to a received ultrasonic signal to provide the sensing voltage to a first node. The input circuit provides the voltage of the first node to a second node. The reset circuit resets the voltage of the second node. The storage circuit stores a voltage difference between the second node and a second supply voltage terminal. The selection circuit provides a third supply voltage to a third node. The source follower outputs a current corresponding to a voltage between a first electrode and a control electrode via an output terminal. The compensation circuit provides a compensated sensing voltage to a control electrode of the source follower.

20 Claims, 5 Drawing Sheets

ULTRASONIC SENSING CIRCUITRY AND RELEADED DRIVING METHOD, DETECTION SUBSTRATE AND TOUCH PANEL

CROSS REFERENCE TO RELATED APPLICATIONS

This patent application is a National Stage Entry of PCT/CN2019/088828 filed on May 28, 2019, the disclosure of which is incorporated by reference herein in its entirety as part of the present application.

BACKGROUND

The present disclosure relates to the field of sensing technology, and particularly to an ultrasonic sensing circuitry and a driving method thereof, a detection substrate and a touch panel.

Currently, with the rapid development of technologies, information sensing technology has been widely used in touch control or fingerprint recognition, for example. Ultrasonic sensing technology is a kind of technology that uses an ultrasonic signal to implement information sensing. Generally, in an ultrasonic sensing circuitry, an ultrasonic sensor emits the ultrasonic signal, receives a reflected ultrasonic signal, and transforms the received ultrasonic signal into an electrical signal. Then, the electrical signal is read by a reading circuit, thereby realizing the information sensing.

BRIEF DESCRIPTION

Embodiments of the present disclosure provide an ultrasonic sensing circuitry, and a method for driving the ultrasonic sensing circuitry, a detection substrate, and a touch panel.

A first aspect of the present disclosure provides an ultrasonic sensing circuitry. The ultrasonic sensing circuitry includes an ultrasonic sensor circuit, an input circuit, a reset circuit, a storage circuit, a selection circuit, a source follower, and a compensation circuit. The ultrasonic sensor circuit is coupled to a first node and a first supply voltage terminal, and configured to emit and receive an ultrasonic signal, and generate a sensing voltage corresponding to the received ultrasonic signal to provide the sensing voltage to the first node. The input circuit is coupled to a first control signal terminal, the first node and a second node, and is configured to provide the sensing voltage of the first node to the second node based on a first control signal from the first control signal terminal. The reset circuit is coupled to a reset control signal terminal, the second node and the first supply voltage terminal, and is configured to provide a first supply voltage from the first supply voltage terminal to the second node based on a reset control signal from the reset control signal terminal to reset the voltage of the second node. The storage circuit is coupled between the second node and the second supply voltage terminal, and is configured to store a voltage difference between the second node and the second supply voltage terminal. The selection circuit is coupled to a selection signal terminal, a third supply voltage terminal and a third node, and is configured to provide a third supply voltage from the third supply voltage terminal to the third node based on a selection signal from the selection signal terminal. The source follower includes a first electrode coupled to the third node, a control electrode coupled to the compensation circuit via a fourth node, and a second electrode coupled to an output terminal, and is configured to output a current corresponding to a voltage between the first electrode and the control electrode via the output terminal. The compensation circuit is coupled to the second supply voltage terminal, a second control signal terminal, a third control signal terminal, the second node, the third node, the fourth node, and the output terminal, and is configured to receive the sensing voltage of the second node and provide a compensated sensing voltage to the control electrode of the source follower according to the sensing voltage and the third supply voltage. The first supply voltage and the second supply voltage are lower than the third supply voltage.

In an embodiment of the present disclosure, the compensation circuit may include a first transistor, a second transistor, a first capacitor, an inverter, a third transistor, and a fourth transistor. A control electrode of the first transistor may be coupled to the second control signal terminal, a first electrode of the first transistor may be coupled to the second node, and a second electrode of the first transistor may be coupled to the fourth node. A control electrode of the second transistor may be coupled to the second control signal terminal, a first electrode of the second transistor may be coupled to the second supply voltage terminal, and a second electrode of the second transistor may be coupled to a fifth node. A first terminal of the first capacitor may be coupled to the third node, and a second terminal of the first capacitor may be coupled to the fifth node. A first terminal of the inverter may be coupled to the second control signal terminal, and a second terminal of the inverter may be coupled to a control electrode of the third transistor. A first electrode of the third transistor may be coupled to the fifth node, and a second electrode of the third transistor may be coupled to the fourth node. And a control electrode of the fourth transistor may be coupled to the third control signal terminal, a first electrode of the fourth transistor may be coupled to the second supply voltage terminal, and a second electrode of the fourth transistor may be coupled to the output terminal. Furthermore, the first transistor, the second transistor, the third transistor, and the fourth transistor may be of the same type.

In an embodiment of the present disclosure, the compensation circuit may include a first transistor, a second transistor, a first capacitor, a third transistor, and a fourth transistor. A control electrode of the first transistor may be coupled to the second control signal terminal, a first electrode of the first transistor may be coupled to the second node, and a second electrode of the first transistor may be coupled to the fourth node. A control electrode of the second transistor may be coupled to the second control signal terminal, a first electrode of the second transistor may be coupled to the second supply voltage terminal, and a second electrode of the second transistor may be coupled to the fifth node. A first terminal of the first capacitor may be coupled to the third node, and a second terminal of the first capacitor may be coupled to the fifth node. A control electrode of the third transistor may be coupled to the second control signal terminal, a first electrode of the third transistor may be coupled to the fifth node, and a second electrode of the third transistor may be coupled to the fourth node. A control electrode of the fourth transistor may be coupled to the third control signal terminal, a first electrode of the fourth transistor may be coupled to the second supply voltage terminal, and a second electrode of the fourth transistor may be coupled to the output terminal. Furthermore, the third transistor and the first transistor may be of different types, and the second transistor and the fourth transistor may be of different types.

In an embodiment of the present disclosure, the ultrasonic sensor circuit may include an ultrasonic sensor and a rectifier circuit. The ultrasonic sensor may be coupled to the first node, and the rectifier circuit may be coupled between the first node and the first supply voltage terminal.

In an embodiment of the present disclosure, the input circuit may include a fifth transistor. A control electrode of the fifth transistor may be coupled to the first control signal terminal, a first electrode of the fifth transistor may be coupled to the first node, and a second electrode of the fifth transistor may be coupled to the second node.

In an embodiment of the present disclosure, the reset circuit may include a sixth transistor. A control electrode of the sixth transistor may be coupled to the reset control signal terminal, a first electrode of the sixth transistor may be coupled to the first supply voltage terminal, and a second electrode of the sixth transistor may be coupled to the second node.

In an embodiment of the present disclosure, the storage circuit may include a second capacitor. A first terminal of the second capacitor may be coupled to the second node, and a second terminal of the second capacitor may be coupled to the second supply voltage terminal.

In an embodiment of the present disclosure, the selection circuit may include a seventh transistor. A control electrode of the seventh transistor may be coupled to the selection signal terminal, a first electrode of the seventh transistor may be coupled to the third supply voltage terminal, and a second electrode of the seventh transistor may be coupled to the third node.

In an embodiment of the present disclosure, the first supply voltage terminal may be provided with a common voltage.

A second aspect of the present disclosure provides a detection substrate. The detection substrate includes a plurality of the ultrasonic sensing circuitries according to the first aspect of the present disclosure.

A third aspect of the present disclosure provides a touch panel. The touch panel includes the detection substrate according to the second aspect of the present disclosure.

A fourth aspect of the present disclosure provides a method for driving the ultrasonic sensing circuitry according to the first aspect of the present disclosure. The method includes resetting, by a reset circuit, a voltage at a second node, providing, in response to an ultrasonic sensor circuit receiving an ultrasonic signal and generating a sensing voltage corresponding to the received ultrasonic signal, the sensing voltage to the second node by an input circuit, and storing the sensing voltage in a storage circuit, providing the sensing voltage to a fourth node, and charging a first terminal and a second terminal of a first capacitor in a compensation circuit, so that a voltage of a first terminal of the first capacitor equals a third supply voltage, and a voltage of a second terminal of the first capacitor equals a second supply voltage, reducing the voltage of the first terminal of the first capacitor to a sum of the sensing voltage and a threshold voltage of a source follower, and increasing the voltage of the first terminal of the first capacitor to the third supply voltage, so as to provide a compensated sensing voltage to a control electrode of the source follower, and outputting by the source follower a current.

BRIEF DESCRIPTION OF THE DRAWINGS

In order to illustrate technical solutions of embodiments of the present disclosure more clearly, drawings of the embodiments will be briefly described below. It could be appreciated that the drawings described below merely relate to some embodiments of the present disclosure, rather than limiting the present disclosure. In the drawings.

DETAILED DESCRIPTION

In order to make technical solutions and advantages of the present disclosure more clear, the technical solutions in the embodiments of the present disclosure will be clearly and completely described below in conjunction with the drawings. Obviously, the embodiments described merely some but not all of embodiments of the present disclosure. Based on the described embodiments of the present disclosure, all other embodiments obtained by those skilled in the art without creative work also fall within the protecting scope of the present disclosure.

Unless otherwise defined, the technical terms or scientific terms used in the present disclosure should have the same meaning as commonly understood by those skilled in the art to which the matter of the present disclosure belongs. The terms such as "first", "second" and the like used in the present disclosure do not denote any order, quantity, or importance, but are used to distinguish different components. Similarly, the terms "a(an)", "one" etc., are not intended to limit the amount, but indicate the presence of at least one element. The terms "comprise", "comprising", "include", "including", "contain", "containing" etc. are intended that an element or article ahead of this term encompasses element(s) (or equivalent(s)) or article(s) (or equivalent(s)) listed behind this term, and does not exclude the other elements or articles. The phrases "connected", "coupled" etc., are not intended to define a physical connection or mechanical connection, but may include an electrical connection, a direct connection or an indirect connection via intermediate media.

Figure 1:
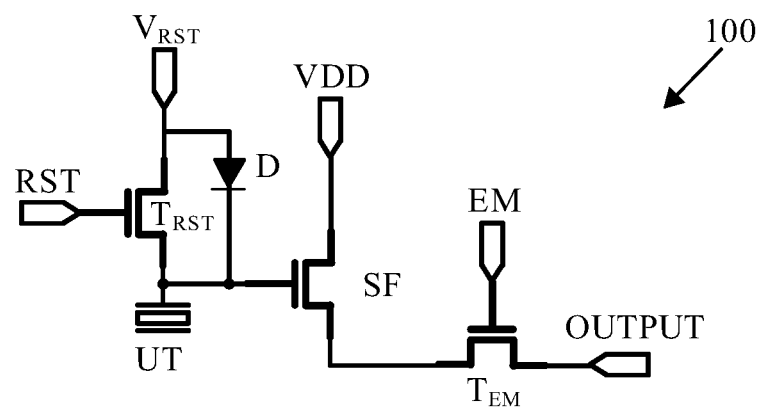
FIG. 1 shows an exemplary circuit diagram of an existing ultrasonic sensing circuitry.

FIG. 1 shows an exemplary schematic diagram of an existing ultrasonic sensing circuitry. As shown in FIG. 1, the ultrasonic sensing circuitry 100 may include an ultrasonic sensor UT, a filter diode D, a reset transistor TRST, a source follower SF, and a selection switch transistor TEM. The ultrasonic sensor UT may emit and receive an ultrasonic signal, and then converts the received ultrasonic signal into an electrical signal. This electrical signal may be provided to a control electrode of the source follower SF. The source follower SF may output a current I from a second electrode based on a voltage difference VGS between a voltage of the electrical signal and a voltage VDD of a first electrode. Based on this current I, corresponding information may be determined. The current I outputted from the second electrode of the source follower SF may be determined by Formula (1):

$$I=K(V_{GS}-V_{th})^2, \quad \text{Formula (1)}$$

where K represents a coefficient, and $V_{th}$ represents a threshold voltage of the source follower SF.

Therefore, it can be seen from Formula (1) that the current I outputted form the second electrode is related to the threshold voltage $V_{th}$ of the source follower SF. Therefore, in the existing ultrasonic sensing circuitry, the drift of the threshold voltage of the source follower would affect accuracy of the collected information directly.

In view of the accuracy problem above, the embodiments of the present disclosure provide a new ultrasonic sensing circuitry which can make a threshold voltage compensation on the voltage of the control electrode of the source follower, such that the current I outputted from the second electrode is independent of the threshold voltage, thereby avoiding the accuracy problem caused by the drift of the threshold voltage.

The embodiments of the present disclosure provide the ultrasonic sensing circuitry and the method for driving the ultrasonic sensing circuitry, the detection substrate, and the touch panel. The embodiments and examples of the present disclosure will be described in detail below in conjunction with the drawings.

Figure 2:
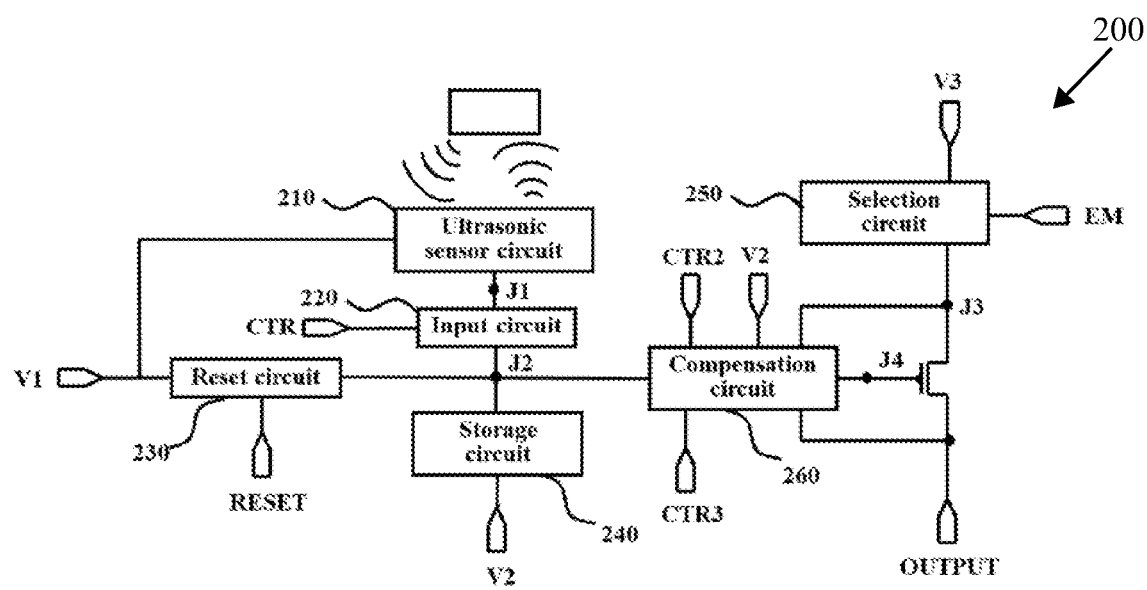
FIG. 2 shows a schematic block diagram of an ultrasonic sensing circuitry according to an embodiment of the present disclosure.

FIG. 2 shows a schematic block diagram of the ultrasonic sensing circuitry 200 according to an embodiment of the present disclosure. As shown in FIG. 2, the ultrasonic sensing circuitry 200 may include an ultrasonic sensor circuit 210, an input circuit 220, a reset circuit 230, a storage circuit 240, a selection circuit 250, a source follower SF and a compensation circuit 260. The ultrasonic sensing circuitry 200 will be described in detail below with reference to the drawing.

The ultrasonic sensor circuit 210 may be coupled to a first node J1 and a first supply voltage terminal. The ultrasonic sensor circuit 210 may emit the ultrasonic signal and receive the reflected ultrasonic signal. Further, the ultrasonic sensor circuit 210 may generate the sensing voltage $V_{Data}$ corresponding to the received ultrasonic signal and provide the sensing voltage $V_{Data}$ to the first node J1. In the embodiments of the present disclosure, the first supply voltage terminal may be a common voltage terminal, for example, a common ground terminal. In this case, a first supply voltage V1 is a common voltage $V_{com}$. Alternatively, the first supply voltage terminal may be grounded. In this case, the first supply voltage V1 is zero.

The input circuit 220 may be coupled to a first control signal terminal, the first node J1, and a second node J2. The input circuit 220 may receive a first control signal CTR1 from the first control signal terminal, and provide the sensing voltage of the first node J1 to the second node J2 based on the first control signal CTR1.

The reset circuit 230 may be coupled to a reset control signal terminal, the second node J2, and the first supply voltage terminal. The reset circuit 230 may receive a reset control signal RESET from the reset control signal terminal, and the first supply voltage V1 from the first supply voltage terminal. The reset circuit 230 may provide the first supply voltage V1 to the second node J2 based on the reset control signal RESET, so as to reset the voltage of the second node J2.

The storage circuit 240 may be coupled between the second node J2 and a second supply voltage terminal, and store a voltage difference between the second node J2 and the second supply voltage terminal. In the embodiments of the present disclosure, the second supply voltage terminal may be the ground terminal. In this case, a second supply voltage V2 equals zero.

The selection circuit 250 may be coupled to a selection signal terminal, a third supply voltage terminal, and a third node J3. The selection circuit 250 may receive a selection signal EM from the selection signal terminal and a third supply voltage V3 from the third supply voltage terminal, and provide the third supply voltage V3 to the third node J3 based on the selection signal EM. In the embodiments of the present disclosure, the third supply voltage terminal may be used to provide an operating voltage to the ultrasonic sensing circuitry 200. Therefore, the third supply voltage V3 is a high level voltage higher than both the first supply voltage V1 and the second supply voltage V2.

The control electrode of the source follower SF may be coupled to a fourth node J4, the first electrode may be coupled to the third node J3, and the second electrode may be coupled to an output terminal OUTPUT. The compensation circuit 260 may also be coupled to the fourth node J4. Therefore, the control electrode of the source follower SF may be coupled to the compensation circuit 260 via the fourth node J4. The source follower SF may output a current signal corresponding to the voltage between the first electrode and the control electrode via an output terminal OUTPUT.

The compensation circuit 260 may be coupled to the second supply voltage terminal, a second control signal terminal, a third control signal terminal, the second node J2, the third node J3, the fourth node J4, and the output terminal OUTPUT. The compensation circuit 260 may receive a second control signal CTR2 from the second control signal terminal and a third control signal CTR3 from the third control signal terminal, and provide a compensated sensing voltage to the fourth node J4 based on the second control signal CTR2 and the third control signal CTR3, so as to provide the compensated sensing voltage to the control electrode of the source follower SF.

Figure 3:
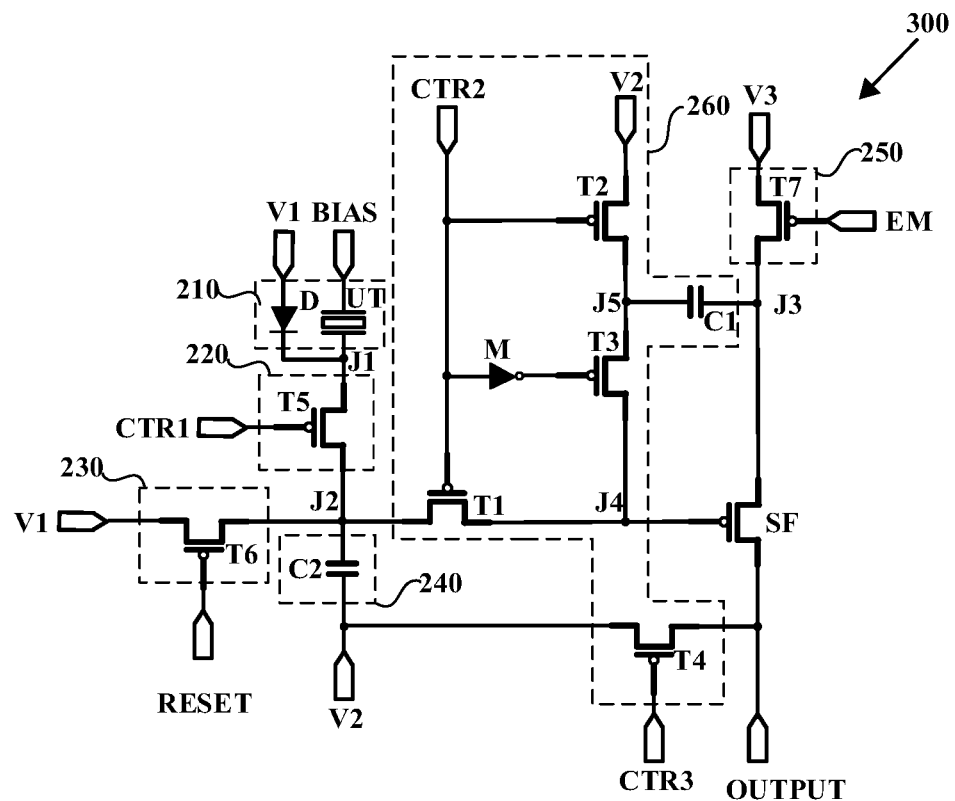
FIG. 3 shows an exemplary circuit diagram of the ultrasonic sensing circuitry according to an embodiment of the present disclosure.

The ultrasonic sensing circuitry provided by the embodiments of the present disclosure will be described below in conjunction with an exemplary circuit structure. FIG. 3 shows an exemplary circuit diagram of the ultrasonic sensing circuitry 300 according to an embodiment of the present disclosure. As shown in FIG. 3, the ultrasonic sensing circuitry 300 includes a first transistor T1 to a seventh transistor T7, a first capacitor C1, a second capacitor C2, an inverter M, and a source follower SF.

It should be noted that all the transistors used in the embodiments of the present disclosure may be thin film transistors, field effect transistors, or other switching devices with the same characteristics. In the embodiments of the present disclosure, all the transistors are thin film transistors. A source electrode and a drain electrode of the transistor used here may be symmetrical in structure, so the source electrode and drain electrode may be no difference in structure. In the embodiments of the present disclosure, a gate electrode of the transistor may be referred to as the control electrode, and the two electrodes other than the gate electrode may be referred to as the first electrode and the second electrode, respectively. In addition, the transistors can be divided into N-type and P-type transistors according to their characteristics. Without considering the threshold voltage, if the transistor is the P-type transistor, an on-voltage equals a low level voltage, and an off-voltage equals the high level voltage. If the transistor is the N-type transistor, the on-voltage equals the high level voltage, and the off-voltage equals the low level voltage. With considering the threshold voltage, if the transistor is the P-type transistor, the transistor will be turned on when the voltage difference between the control electrode and the first electrode of the transistor is less than or equal to the threshold voltage. If the transistor is the N-type transistor, the transistor will be turned on when the voltage difference between the control electrode and the first electrode of the transistor is greater than or equal to the threshold voltage.

As shown in FIG. 3, the compensation circuit 260 may include the first transistor T1, the second transistor T2, the first capacitor C1, the inverter M, the third transistor T3, and the fourth transistor T4. The compensation circuit 260 will be described in detail below with reference to the drawing.

A control electrode of the first transistor T1 may be coupled to the second control signal terminal to receive the second control signal CTR2. A first electrode of the first transistor T1 may be coupled to the second node J2, and a second electrode may be coupled to the fourth node J4. In the embodiment, when the second control signal CTR2 is at the low level, the first transistor T1 is turned on, and the voltage of the second node J2 is provided to the fourth node J4.

A control electrode of the second transistor T2 may be coupled to the second control signal terminal to receive the second control signal CTR2. A first electrode of the second transistor T2 may be coupled to the second supply voltage terminal to receive the second supply voltage V2. A second electrode of the second transistor T2 may be coupled to a fifth node J5. In the embodiment, when the second control signal CTR2 is at the low level, the second transistor T2 is turned on, and the received second supply voltage V2 is provided to the fifth node J5.

A first terminal of the first capacitor C1 may be coupled to the third node J3, and a second terminal may be coupled to the fifth node J5. The first capacitor C1 can store a voltage difference between the voltage of the third node J3 and the voltage of the fifth node J5. In the embodiment, when the voltage of the third node J3 changes and the fifth node J5 is in a floating state, since the voltage difference stored in the first capacitor C1 is unchanged (i.e., due to the equipotential jumping of the capacitor), the voltage of the fifth node J5 may become the difference between the changed voltage of the third node J3 and the stored voltage difference of the first capacitor C1.

A first terminal of the inverter M may be coupled to the second control signal terminal to receive the second control signal CTR2. A second electrode of the inverter M may be coupled to a control electrode of the third transistor T3. In the embodiment, when the voltage of the second control signal CTR2 is at a high level, under action of the inverter M, the voltage of the control electrode of the third transistor T3 is at the low level. When the voltage of the second control signal CTR2 is at a low level, under the action of the inverter M, the voltage of the control electrode of the third transistor T3 is at the high level.

A first electrode of the third transistor T3 may be coupled to the fifth node J5, and a second electrode may be coupled to the fourth node J4. When the voltage of the control electrode of the third transistor T3 is at the low level, the third transistor T3 is turned on, and the voltage of the fifth node J5 is provided to the fourth node J4.

A control electrode of the fourth transistor T4 may be coupled to the third control signal terminal to receive the third control signal CTR3. A first electrode of the fourth transistor T4 may be coupled to the second supply voltage terminal, and a second electrode of the fourth transistor T4 may be coupled to the output terminal OUTPUT. When the third control signal CTR3 is at the low level, the fourth transistor T4 is turned on, and thus the voltage of the second electrode of the source follower SF becomes the second supply voltage V2.

The ultrasonic sensor circuit 210 may include an ultrasonic sensor UT and a rectifier circuit. The ultrasonic sensor UT may be coupled to the first node J1. The rectifier circuit may be coupled between the first node J1 and the first supply voltage terminal. In the embodiment, the rectifier circuit is the diode D. A backward voltage (i.e., a portion smaller than the first supply voltage V1) at the first node J1 may be provided to the first supply voltage terminal via the diode D.

The input circuit 220 may include the fifth transistor T5. A control electrode of the fifth transistor T5 may be coupled to the first control signal terminal to receive the first control signal CTR1. A first electrode of the fifth transistor T5 may be coupled to the first node J1, and a second electrode of the fifth transistor T5 may be coupled to the second node J2. In the embodiment, when the first control signal CTR1 is at the low level, the fifth transistor T5 is turned on, and the sensing voltage at the first node J1 is provided to the second node J2.

The reset circuit 230 may include the sixth transistor T6. A control electrode of the sixth transistor T6 may be coupled to the reset control signal terminal to receive the reset control signal RESET. A first electrode of the sixth transistor T6 may be coupled to the first supply voltage terminal to receive the first supply voltage V1. A second electrode of the sixth transistor T6 may be coupled to the second node J2. In the embodiment, when the reset control signal RESET is at the low level, the sixth transistor T6 is turned on to provide the first supply voltage V1 to the second node J2 to reset the voltage of the second node J2.

The storage circuit 240 may include the second capacitor C2. A first terminal of the second capacitor C2 may be coupled to the second node J2, and a second terminal of the second capacitor C2 may be coupled to the second supply voltage terminal. In the embodiment, when the voltage of the second node J2 is at the high level, the second capacitor C2 may store and maintain the voltage difference between the second node J2 and the second supply voltage terminal.

The selection circuit 250 may include the seventh transistor T7. A control electrode of the seventh transistor T7 may be coupled to the selection signal terminal to receive the selection signal EM. A first electrode of the seventh transistor T7 may be coupled to the third supply voltage terminal to receive the third supply voltage V3. A second electrode of the seventh transistor T7 may be coupled to the third node J3. In the embodiment, when the selection signal EM is at the low level, the seventh transistor T7 is turned on to provide the third supply voltage V3 to the third node J3.

In the embodiment as shown in FIG. 3, the first to seventh transistors T1 to T7 and the source follower SF are of the same type, and are all the P-type transistors. Those skilled in the art will appreciate that the first to seventh transistors T1 to T7 and the source follower SF may also all be the N-type transistors.

In addition, in some embodiments of the present disclosure, the ultrasonic sensor circuit 210 may include only an ultrasonic sensor UT, which may be coupled to the first node J1. In this case, the ultrasonic sensing circuitry 300 may further include a rectifier circuit, such as the diode. The rectifier circuit may be coupled between the second node J2 and the first supply voltage terminal.

Figure 4:
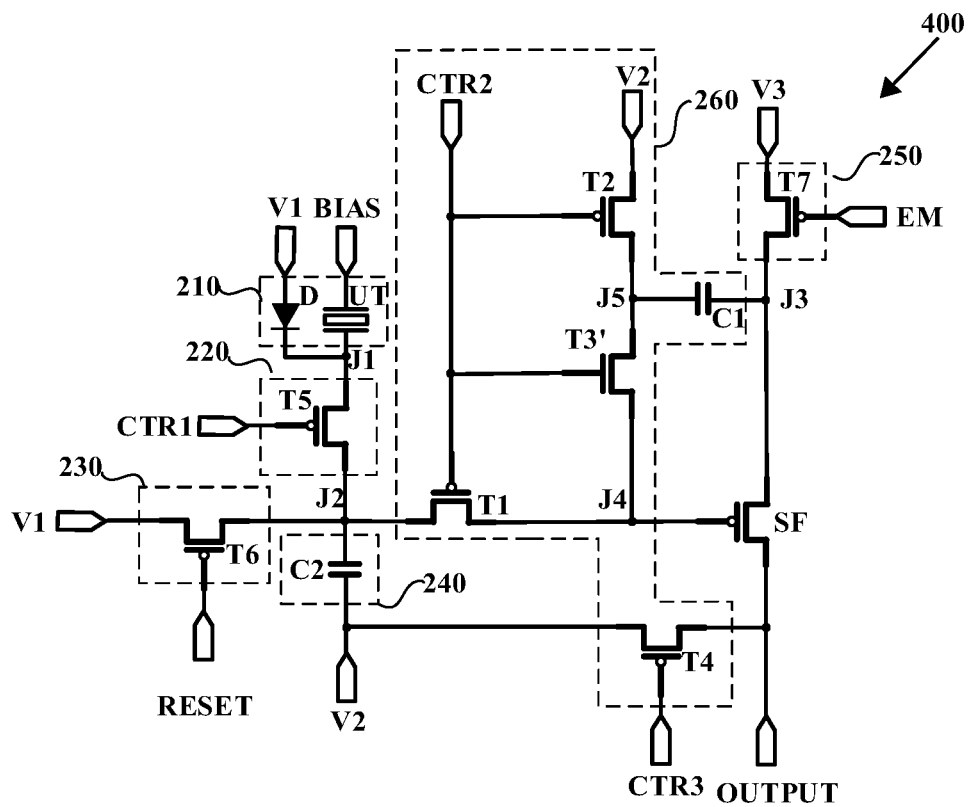
FIG. 4 shows an exemplary circuit diagram of the ultrasonic sensing circuitry according to an embodiment of the present disclosure.

FIG. 4 shows an exemplary circuit diagram of the ultrasonic sensing circuitry 400 according to another embodiment of the present disclosure. As shown in FIG. 4, the ultrasonic sensing circuitry 400 may include the first transistor T1 to the seventh transistor T7, the first and second capacitors C1 and C2, and a source follower SF. Unlike the ultrasonic sensing circuitry 300 as shown in FIG. 3, in the compensation circuit 260 as shown in FIG. 4, a single third transistor T3' is used instead of the inverter M and the third transistor T3 in FIG. 3.

A control electrode of the third transistor T3' may be coupled to the second control signal terminal to receive the second control signal CTR2. A first electrode of the third transistor T3' may be coupled to the fifth node J5, and a second electrode of the third transistor T3' may be coupled to the fourth node J4. In the embodiment, when the second control signal CTR2 is at the high level, the third transistor T3' is turned on to provide the voltage of the fifth node J5 to the fourth node J4. The structure and function of the remaining circuit components of the ultrasonic sensing circuitry 400 as shown in FIG. 4 may be the same as the corresponding circuit components of the ultrasonic sensing circuitry 300 as shown in FIG. 3, and the description of these circuit components will be omitted herein.

In the embodiment as shown in FIG. 4, the first transistor T1, the second transistor T2, the fourth transistor T4 to the seventh transistor T7, and the source follower SF are all the P-type transistors. The third transistor T3' is of a different type from other transistors and is of N-type. Those skilled in the art will appreciate that the first transistor T1, the second transistor T2, the fourth transistor T4 to the seventh transistor T7, and the source follower SF may also be the N-type transistors, while the third transistor T3' is the P-type transistor.

The working process of the ultrasonic sensing circuitry 300 as shown in FIG. 3 will be described below in conjunction with a timing diagram of signals in FIG. 5.

Figure 5:
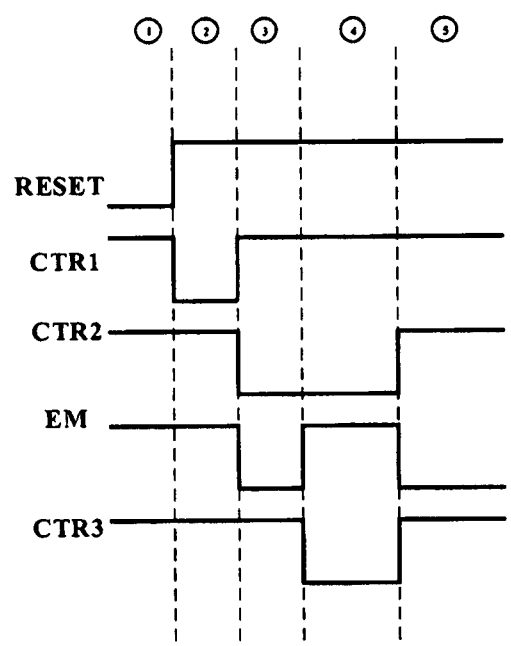
FIG. 5 shows a timing diagram of signals during a working process of the ultrasonic sensing circuitry as shown in FIG. 2.

FIG. 5 shows the timing diagram of signals during a working process of the ultrasonic sensing circuitry 300 as shown in FIG. 3. It will be appreciated that the signal voltages in the timing diagram of signals as shown in FIG. 5 is only schematic and does not represent the actual voltage values.

As shown in FIG. 5, in a first period, the reset control signal RESET at the low level is provided at the reset control signal terminal, and the sixth transistor T6 is turned on. The received first supply voltage V1 is provided to the second node J2 to reset the voltage of the second node J2.

In a second period, the ultrasonic sensor circuit 210 generates the sensing voltage $V_{Data}$ corresponding to the received ultrasonic signal by emitting and receiving the ultrasonic signal. In the embodiment, the sensing voltage corresponding to the received ultrasonic signal may be an AC voltage. The diode D can remove the backward voltage (i.e., the portion smaller than the first supply voltage V1) in the AC voltage by means of a rectification process, thereby generating the sensing voltage $V_{Data}$ including only a positive voltage (i.e., a portion greater than the first supply voltage V1) at the first node J1. In addition, the ultrasonic sensing circuitry 300 receives the first control signal CTR1 at the low level, the fifth transistor T5 is turned on, and the sensing voltage $V_{Data}$ at the first node J1 is provided to the second node J2. In the embodiment, the difference between the sensing voltage $V_{Data}$ and the third supply voltage $V_3$ is less than the threshold voltage $V_{th}$, i.e. $V_{Data}-V3<-|V_{th}|$.

In a third period, the second control signal CTR2 at the low level is provided at the second control signal terminal. The second transistor T2 is turned on, and the second supply voltage V2 is provided to the fifth node J5. The first transistor T1 is turned on, and the ultrasonic sensing circuitry 300 receives the selection signal EM at the low level. The seventh transistor T7 is turned on, and the third supply voltage V3 is provided to the third node J3. The first capacitor C1 stores the voltage difference between the third node J3 and the fifth node J5 of V3-V2. As described above, in the embodiment, the second supply voltage terminal is the ground terminal, and thus the voltage difference between the third node J3 and the fifth node J5 is equal to V3. In addition, when the first transistor T1 is turned on, the sensing voltage $V_{Data}$ is provided to the fourth node J4. Due to $V_{Data}-V3<-|V_{th}|$, the source follower SF is turned on.

In a fourth period, the second control signal CTR2 at the low level is provided at the second control signal terminal. The second transistor T2 is turned on, and the second supply voltage V2 is continuously provided to the fifth node J5. The source follower SF remains turned on. The ultrasonic sensing circuitry 300 receives the third control signal CTR3 at the low level, and the fourth transistor T4 is turned on. Therefore, the voltage of the third node J3 is discharged (i.e., the first capacitor C1 is discharged) until the source follower SF is turned off. When the source follower SF is turned off, the voltage of the third node J3 is equal to $V_{Data}+|V_{th}|$. In this case, the voltage difference stored in the first capacitor C1 is $V_{Data}+|V_{th}|-V2$, i.e. $V_{Data}+|V_{th}|$.

In a fifth period, the selection signal EM at the low level is provided at the selection signal terminal. The seventh transistor T7 is turned on, and the third supply voltage V3 is provided to the third node J3, and the voltage of the third node J3 equals V3. Due to the equipotential jumping of the first capacitor C1, the voltage of the fifth node J5 equals $V3-(V_{Data}+|V_{th}|)$. The ultrasonic sensing circuitry 300 receives the second control signal CTR2 at the high level. Under the action of the inverter M, the third transistor T3 is turned on, and the voltage of the fifth node J5 is provided to the fourth node J4, and the voltage of the fourth node J4 equals $V3-(V_{Data}+|V_{th}|)$. Thus, the compensated sensing voltage $V3-(V_{Data}+|V_{th}|)$ is provided to the control electrode of the source follower SF. In this case, the current I outputted from the second electrode of the source follower may be calculated by means of Formula (1) as follows:

$$I=K(V_{GS}-V_{th})^2$$

$$=K[(V3-V_{Data}-|V_{th}|)-V3+|V_{th}|]^2$$

$$=K \cdot V_{Data}^2, \qquad \text{Formula (2)}$$

where K represents a coefficient.

It can be seen from Formula (2) that the current I outputted from the second electrode of the source follower SF is independent of the threshold voltage $V_{th}$. Therefore, the accuracy of the collected information cannot be affected by the threshold voltage $V_{th}$ of the source follower.

Figure 6:
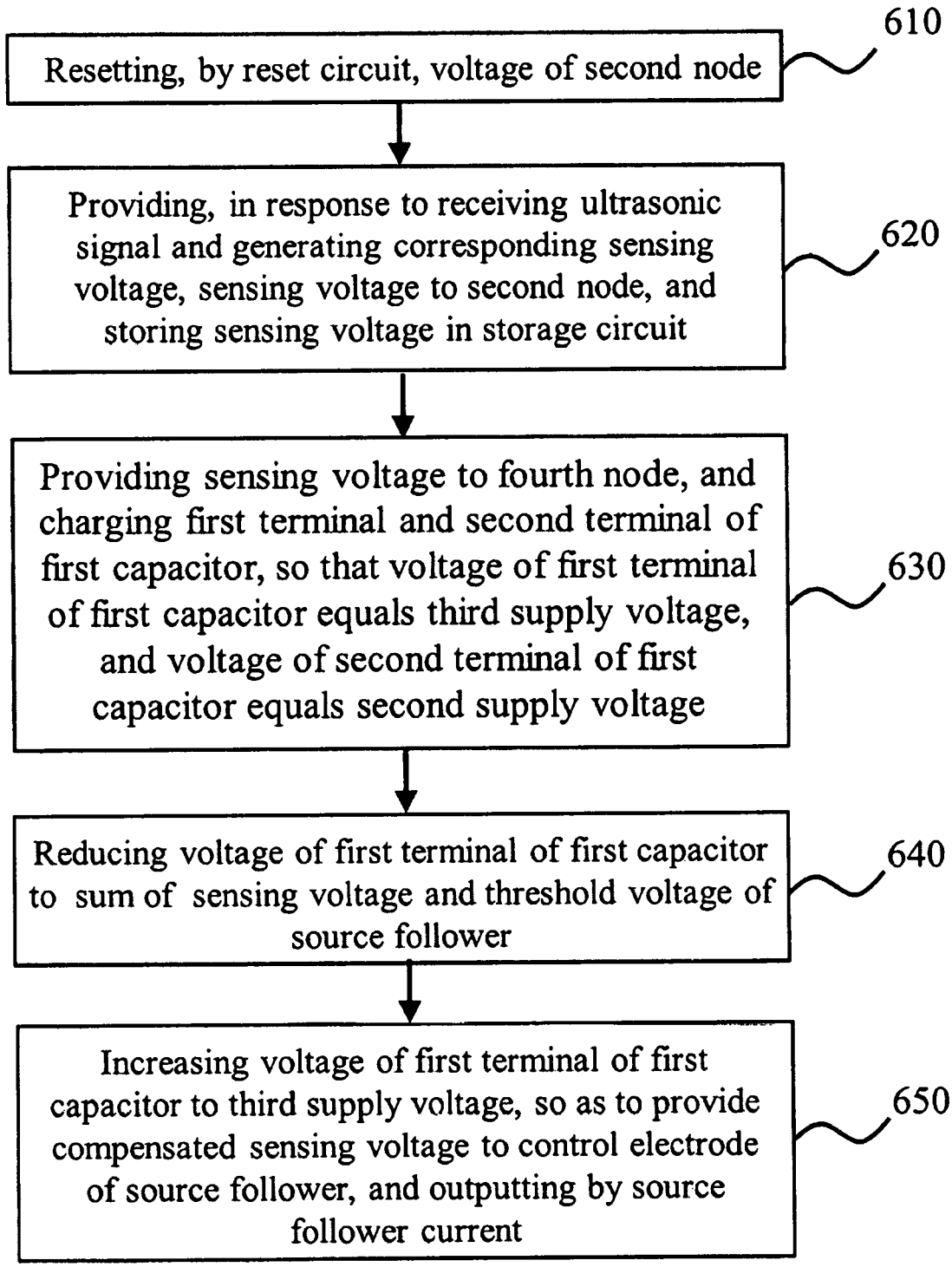
FIG. 6 shows a schematic flowchart of a method for driving the ultrasonic sensing circuitry according to an embodiment of the present disclosure.

In addition, an embodiment of the present disclosure also provides a method for driving the ultrasonic sensing circuitry. FIG. 6 shows a schematic flowchart of the method for driving the ultrasonic sensing circuitry according to an embodiment of the present disclosure. The ultrasonic sensing circuitry may be any applicable ultrasonic sensing circuitry based on the embodiments of the present disclosure.

At step 610, the voltage of the second node J2 is reset by the reset circuit 230. In the embodiment, the reset circuit 230 may provide the received first supply voltage V1 at the low level to the second node J2 based on the reset control signal RESET, so as to reset the second node J2.

At step 620, in response to the ultrasonic sensor circuit 210 receiving the ultrasonic signal and generating the sensing voltage $V_{Data}$ corresponding to the received ultrasonic signal, the sensing voltage $V_{Data}$ is provided to the second node J2 by the input circuit 220 and stored in the storage circuit 240. In the embodiment, the ultrasonic sensor UT may emit the ultrasonic signal and receive the reflected ultrasonic signal to obtain the corresponding AC voltage. Then, the rectifier circuit may rectify the AC voltage to generate the sensing voltage $V_{Data}$ including only the forward voltage at the first node J1. The input circuit 220 may provide the sensing voltage $V_{Data}$ at the first node J1 to the second node J2 based on the first control signal CTR1. The storage circuit 240 may store the voltage difference between the sensing voltage $V_{Data}$ and the second supply voltage V2.

At step 630, the sensing voltage $V_{Data}$ is provided to the fourth node J4 and charges the first terminal and the second terminal of the first capacitor C1 in the compensation circuit 260, and thus the voltage of the first terminal of the first capacitor C1 equals the third supply voltage V3 and the voltage of the second terminal of the first capacitor C1 equals the second supply voltage V2. In the embodiment, the third supply voltage V3 is provided to the third node J3 based on the selection signal EM, so that the voltage of the first terminal of the first capacitor C1 equals V3. Based on the second control signal CTR2, the second supply voltage V2 is provided to the fifth node J5. Therefore, the voltage of the second terminal of the first capacitor C1 equals V2. As described above, the second supply voltage terminal may be the ground terminal, and thus the voltage difference stored in the first capacitor C1 may equal V3.

At step 640, the voltage of the first terminal of the first capacitor C1 is reduced to a sum of the sensing voltage $V_{Data}$ and the threshold voltage $V_{th}$ of the source follower SF. In the embodiment, based on the third control signal CTR3, the fifth transistor T5 may be turned on. And, the source follower SF may be turned on, so that the third node J3 can be discharged (i.e., the first capacitor C1 is discharged) until the voltage between the control electrode and the first electrode of the source follower SF is less than the threshold voltage, i.e. $|V_{GS}|<|V_{th}|$, then the source follower SF may be turned off. As described above, the voltage of the control electrode of the source follower SF may equal $V_{Data}$, so that the voltage of the first electrode of the source follower SF (or the third node J3) may equal $V_{Data}+|V_{th}|$. In this case, the voltage difference stored in the first capacitor C1 may equal $V_{Data}+|V_{th}|$.

At step 650, the voltage of the first terminal of the first capacitor C1 is increased to the third supply voltage V3, so as to provide the compensated sensing voltage to the control electrode of the source follower SF, and the source follower SF outputs the current. In the embodiment, based on the selection signal EM, the third supply voltage V3 may be provided to the third node J3 again, so that the voltage of the third node J3 may equal V3. Due to the equipotential jumping of the first capacitor C1, the voltage of the fifth node J5 may equal $V3-(V_{Data}+|V_{th}|)$. Based on the second control signal CTR2, the third transistor T3 may be turned on. The voltage of the fifth node J5 may be provided to the fourth node J4, so that the voltage of the fourth node J4 may equal $V3-(V_{Data}+|V_{th}|)$. Thus, the compensated sensing voltage $V3-(V_{Data}+|V_{th}|)$ may be provided to the control electrode of the source follower SF. Then, the source follower SF may output the current signal via the output terminal OUTPUT based on the compensated voltage. In the embodiment, it can be seen from the above Formula (2) that the current I outputted at the second electrode of the source follower SF is independent of the threshold voltage $V_{th}$. That is, the accuracy of the collected information cannot be affected by the threshold voltage $V_{th}$ of the source follower SF.

Those skilled in the art will appreciate that the above steps are described in an order, which is not intended to limit on the order in which the method is performed, and the embodiments of the present disclosure may also be implemented in any other suitable order.

Figure 7:
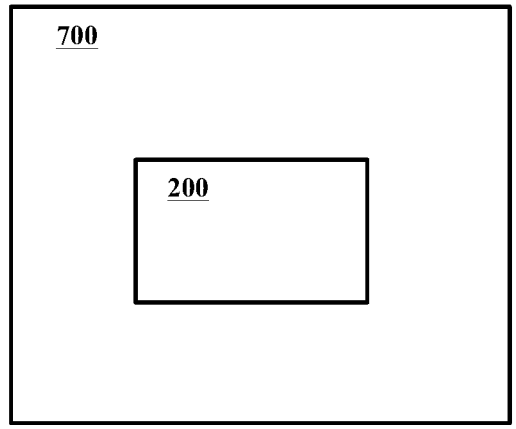
FIG. 7 shows a schematic block diagram of a detection substrate according to an embodiment of the present disclosure.

Moreover, an embodiment of the present disclosure also provides a detection substrate. FIG. 7 shows a schematic block diagram of the detection substrate 700 according to an embodiment of the present disclosure. In FIG. 7, the detection substrate 700 may include a plurality of the ultrasonic sensing circuitries 200 according to the embodiments of the present disclosure.

Figure 8:
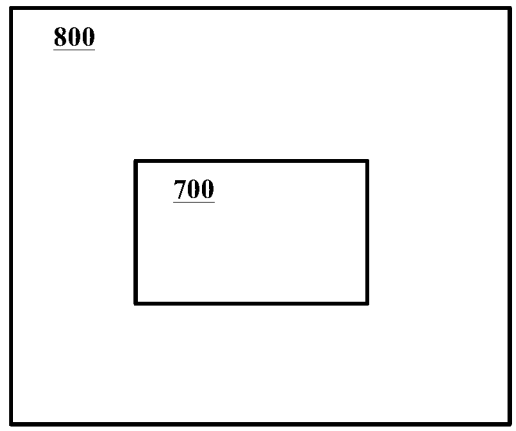
FIG. 8 shows a schematic block diagram of a touch panel according to an embodiment of the present disclosure.

In addition, an embodiment of the present disclosure also provides a touch panel including the detection substrate above. FIG. 8 shows a schematic block diagram of the touch panel 800 according to an embodiment of the present disclosure. In FIG. 8, the touch panel 800 may include the detection substrate 700 as shown in FIG. 7. In the embodiment, the touch panel may be a liquid crystal panel, a liquid crystal TV, a display, an OLED panel, an OLED TV, an e-paper display device, a mobile phone, a tablet computer, a laptop computer, a digital photo frame, a navigator, etc. with an information collection function (for example, a fingerprint recognition function or a touch control function, etc.). Several embodiments of the present disclosure have been described in detail above, but the protection scope of the present disclosure is not limited thereto. Obviously, various modifications, substitutions, or variations in form of the embodiments of the present disclosure may be made by those of ordinary skilled in the art without departing from the spirit and scope of the present disclosure. The protection scope of the present disclosure is defined by the appended claims.

What is claimed is:

1. An ultrasonic sensing circuitry comprising an ultrasonic sensor circuit, an input circuit, a reset circuit, a storage circuit, a selection circuit, a source follower, and a compensation circuit, wherein the ultrasonic sensor circuit is coupled to a first node and a first supply voltage terminal, and is configured to emit and receive an ultrasonic signal, and to generate a sensing voltage corresponding to the received ultrasonic signal to provide the sensing voltage to the first node;

wherein the input circuit is coupled to a first control signal terminal, the first node, and a second node, and is configured to provide the sensing voltage of the first node to the second node based on a first control signal from the first control signal terminal;

wherein the reset circuit is coupled to a reset control signal terminal, the second node, and the first supply voltage terminal, and is configured to provide a first supply voltage from the first supply voltage terminal to the second node based on a reset control signal from the reset control signal terminal to reset the voltage of the second node;

wherein the storage circuit is coupled between the second node and the second supply voltage terminal, and is configured to store a voltage difference between the second node and the second supply voltage terminal;

wherein the selection circuit is coupled to a selection signal terminal, a third supply voltage terminal, and a third node, and is configured to provide a third supply voltage from the third supply voltage terminal to the third node based on a selection signal from the selection signal terminal;

wherein the source follower comprises a first electrode coupled to the third node, a control electrode coupled to the compensation circuit via a fourth node, and a second electrode coupled to an output terminal, and is configured to output a current corresponding to a voltage between the first electrode and the control electrode via the output terminal;

wherein the compensation circuit is coupled to the second supply voltage terminal, a second control signal terminal, a third control signal terminal, the second node, the third node, the fourth node, and the output terminal, and is configured to receive the sensing voltage of the second node and provide a compensated sensing voltage to the control electrode of the source follower according to the sensing voltage and the third supply voltage; and wherein both the first supply voltage and the second supply voltage are lower than the third supply voltage.

2. The ultrasonic sensing circuitry according to claim 1, wherein the compensation circuit comprises a first transistor, a second transistor, a first capacitor, an inverter, a third transistor, and a fourth transistor, wherein a control electrode of the first transistor is coupled to the second control signal terminal, wherein a first electrode of the first transistor is coupled to the second node, and wherein a second electrode of the first transistor is coupled to the fourth node;

wherein a control electrode of the second transistor is coupled to the second control signal terminal, wherein a first electrode of the second transistor is coupled to the second supply voltage terminal, and wherein a second electrode of the second transistor is coupled to a fifth node;

wherein a first terminal of the first capacitor is coupled to the third node, and wherein a second terminal of the first capacitor is coupled to the fifth node;

wherein a first terminal of the inverter is coupled to the second control signal terminal, and wherein a second terminal of the inverter is coupled to a control electrode of the third transistor;

wherein a first electrode of the third transistor is coupled to the fifth node, and wherein a second electrode of the third transistor is coupled to the fourth node;

wherein a control electrode of the fourth transistor is coupled to the third control signal terminal, wherein a first electrode of the fourth transistor is coupled to the second supply voltage terminal, and wherein a second electrode of the fourth transistor is coupled to the output terminal; and wherein the first transistor, the second transistor, the third transistor, and the fourth transistor are of the same type.

3. The ultrasonic sensing circuitry according to claim 1, wherein the compensation circuit comprises a first transistor, a second transistor, a first capacitor, a third transistor, and a fourth transistor, wherein a control electrode of the first transistor is coupled to the second control signal terminal, wherein a first electrode of the first transistor is coupled to the second node, and wherein a second electrode of the first transistor is coupled to the fourth node;

wherein a control electrode of the second transistor is coupled to the second control signal terminal, wherein a first electrode of the second transistor is coupled to the second supply voltage terminal, and wherein a second electrode of the second transistor is coupled to the fifth node;

wherein a first terminal of the first capacitor is coupled to the third node, and wherein a second terminal of the first capacitor is coupled to the fifth node;

wherein a control electrode of the third transistor is coupled to the second control signal terminal, wherein a first electrode of the third transistor is coupled to the fifth node, and wherein a second electrode of the third transistor is coupled to the fourth node;

wherein a control electrode of the fourth transistor is coupled to the third control signal terminal, wherein a first electrode of the fourth transistor is coupled to the second supply voltage terminal, and wherein a second electrode of the fourth transistor is coupled to the output terminal; and wherein the third transistor and the first transistor are of different types, and wherein the second transistor and the fourth transistor are of different types.

4. The ultrasonic sensing circuitry according to claim 1, wherein the ultrasonic sensor circuit comprises an ultrasonic sensor and a rectifier circuit, wherein the ultrasonic sensor is coupled to the first node, and wherein the rectifier circuit is coupled between the first node and the first supply voltage terminal.

5. The ultrasonic sensing circuitry according to claim 1, wherein the input circuit comprises a fifth transistor, wherein a control electrode of the fifth transistor is coupled to the first control signal terminal, wherein a first electrode of the fifth transistor is coupled to the first node, and wherein a second electrode of the fifth transistor is coupled to the second node.

6. The ultrasonic sensing circuitry according to claim 1, wherein the reset circuit comprises a sixth transistor, wherein a control electrode of the sixth transistor is coupled to the reset control signal terminal, wherein a first electrode of the sixth transistor is coupled to the first supply voltage terminal, and wherein a second electrode of the sixth transistor is coupled to the second node.

7. The ultrasonic sensing circuitry according to claim 1, wherein the storage circuit comprises a second capacitor, wherein a first terminal of the second capacitor is coupled to the second node, and wherein a second terminal of the second capacitor is coupled to the second supply voltage terminal.

8. The ultrasonic sensing circuitry according to claim 1, wherein the selection circuit comprises a seventh transistor, wherein a control electrode of the seventh transistor is coupled to the selection signal terminal, wherein a first electrode of the seventh transistor is coupled to the third supply voltage terminal, and wherein a second electrode of the seventh transistor is coupled to the third node.

9. The ultrasonic sensing circuitry according to claim 1, wherein
the first supply voltage terminal is provided with a common voltage.

10. A method for driving the ultrasonic sensing circuitry according to claim 1, the method comprising:
resetting, by a reset circuit, a voltage of a second node;
providing, in response to an ultrasonic sensor circuit receiving an ultrasonic signal and generating a sensing voltage corresponding to the received ultrasonic signal, the sensing voltage to the second node by an input circuit, and storing the sensing voltage in a storage circuit;

providing the sensing voltage to a fourth node, and charging a first terminal and a second terminal of a first capacitor in a compensation circuit, so that a voltage of the first terminal of the first capacitor equals a third supply voltage, and a voltage of the second terminal of the first capacitor equals a second supply voltage;

reducing the voltage of the first terminal of the first capacitor to a sum of the sensing voltage and a threshold voltage of a source follower; and increasing the voltage of the first terminal of the first capacitor to the third supply voltage, so as to provide a compensated sensing voltage to a control electrode of the source follower, and outputting by the source follower a current.

11. The ultrasonic sensing circuitry according to claim 2, wherein the ultrasonic sensor circuit comprises an ultrasonic sensor and a rectifier circuit, wherein the ultrasonic sensor is coupled to the first node, and wherein the rectifier circuit is coupled between the first node and the first supply voltage terminal.

12. The ultrasonic sensing circuitry according to claim 2, wherein the input circuit comprises a fifth transistor, wherein a control electrode of the fifth transistor is coupled to the first control signal terminal, wherein a first electrode of the fifth transistor is coupled to the first node, and wherein a second electrode of the fifth transistor is coupled to the second node.

13. The ultrasonic sensing circuitry according to claim 2, wherein the reset circuit comprises a sixth transistor, wherein a control electrode of the sixth transistor is coupled to the reset control signal terminal, wherein a first electrode of the sixth transistor is coupled to the first supply voltage terminal, and wherein a second electrode of the sixth transistor is coupled to the second node.

14. The ultrasonic sensing circuitry according to claim 2, wherein the storage circuit comprises a second capacitor, wherein a first terminal of the second capacitor is coupled to the second node, and wherein a second terminal of the second capacitor is coupled to the second supply voltage terminal.

15. The ultrasonic sensing circuitry according to claim 2, wherein the selection circuit comprises a seventh transistor, wherein a control electrode of the seventh transistor is coupled to the selection signal terminal, wherein a first electrode of the seventh transistor is coupled to the third supply voltage terminal, and wherein a second electrode of the seventh transistor is coupled to the third node.

16. The ultrasonic sensing circuitry according to claim 3, wherein the ultrasonic sensor circuit comprises an ultrasonic sensor and a rectifier circuit, wherein the ultrasonic sensor is coupled to the first node, and wherein the rectifier circuit is coupled between the first node and the first supply voltage terminal.

17. The ultrasonic sensing circuitry according to claim 3, wherein the input circuit comprises a fifth transistor, wherein a control electrode of the fifth transistor is coupled to the first control signal terminal, wherein a first electrode of the fifth transistor is coupled to the first node, and wherein a second electrode of the fifth transistor is coupled to the second node.

18. The ultrasonic sensing circuitry according to claim 3, wherein the reset circuit comprises a sixth transistor, wherein a control electrode of the sixth transistor is coupled to the reset control signal terminal, wherein a first electrode of the sixth transistor is coupled to the first supply voltage terminal, and wherein a second electrode of the sixth transistor is coupled to the second node.

19. The ultrasonic sensing circuitry according to claim 3, wherein the storage circuit comprises a second capacitor, wherein a first terminal of the second capacitor is coupled to the second node, and wherein a second terminal of the second capacitor is coupled to the second supply voltage terminal.

20. The ultrasonic sensing circuitry according to claim 3, wherein the selection circuit comprises a seventh transistor, wherein a control electrode of the seventh transistor is coupled to the selection signal terminal, wherein a first electrode of the seventh transistor is coupled to the third supply voltage terminal, and wherein a second electrode of the seventh transistor is coupled to the third node.

* * * * *